J. B. DAWSON.
BEET TOPPER OR CROWNER.
APPLICATION FILED FEB. 12, 1913.
1,068,986.
Patented July 29, 1913.
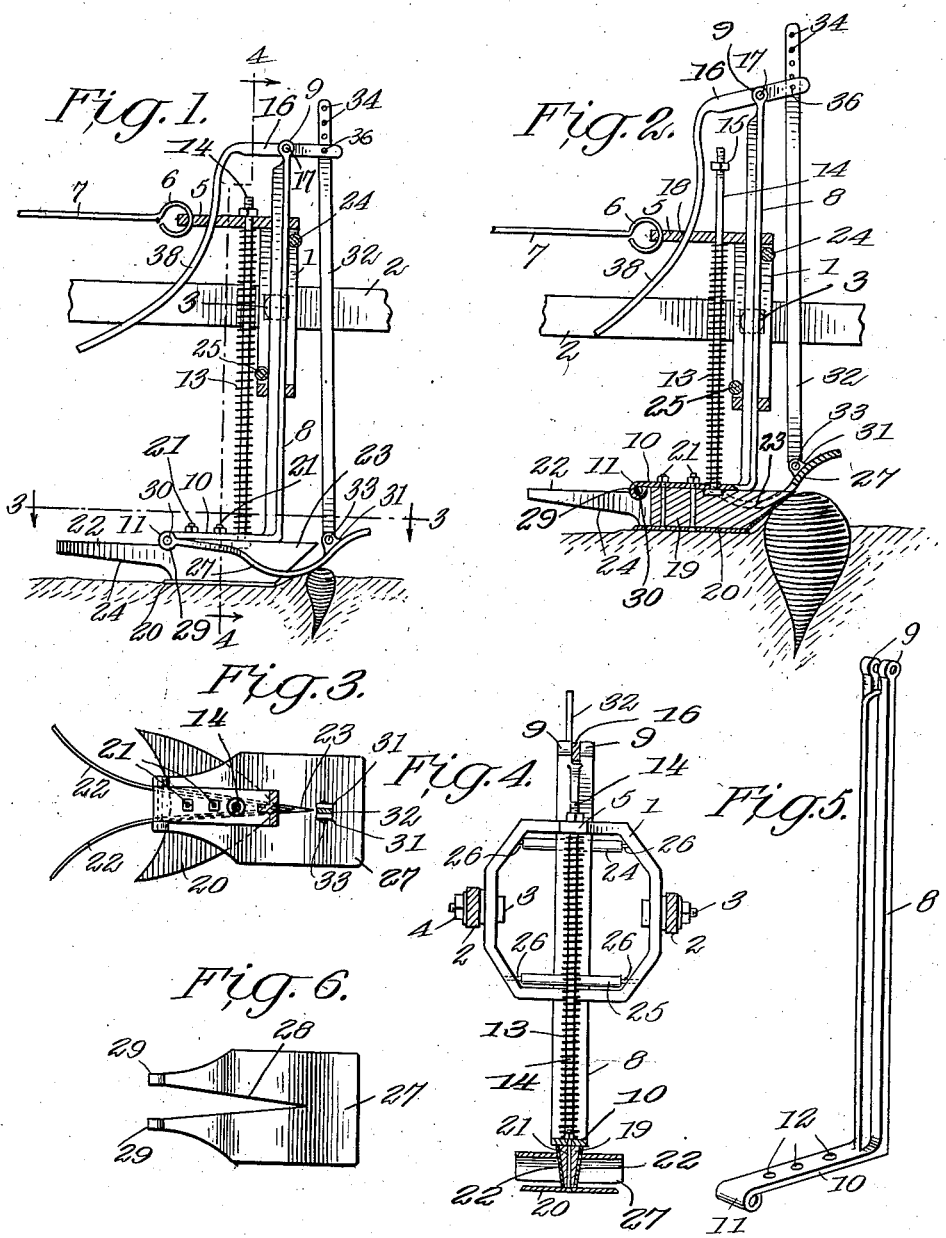
WITNESSES
INVENTOR
JAMES B. DAWSON
BY
ATTORNEYS

UNITED STATES PATENT OFFICE.

JAMES B. DAWSON, OF POMPEYS PILLAR, MONTANA.

BEET TOPPER OR CROWNER.

1,068,986.　　　　Specification of Letters Patent.　　Patented July 29, 1913.

Application filed February 12, 1913. Serial No. 747,878.

*To all whom it may concern:*

Be it known that I, JAMES B. DAWSON, a citizen of the United States, and a resident of Pompeys Pillar, in the county of Yellowstone and State of Montana, have invented certain new and useful Improvements in Beet Toppers or Crowners, of which the following is a specification.

My invention is an improvement in beet toppers or crowners, and has for its object the provision of a simple, inexpensive and automatically operated device of the character specified, capable of being attached to existing lifting machines without essential change in the said machines, and wherein means are provided for crowning the individual beets while they are yet held in position in the ground before being lifted by the lifting mechanism, at a depth determined by the size and height of the beet itself, and wherein means are also provided for permitting the device to be moved into or out of operative position.

In the drawings: Figure 1 is a side view of the improvement with parts in section, showing the device about to crown a small beet; Fig. 2 is a similar view showing the device about to crown a large beet; Figs. 3 and 4 are sections on the lines 3—3 and 4—4 respectively, of Fig. 1; Fig. 5 is a perspective view of the shank; and, Fig. 6 is a bottom plan view of the guiding shoe for engaging the beet to determine the position of the crowning device.

The present embodiment of the invention is an improvement over my prior application, Serial No. 693,642, filed April 27, 1912, and is designed for use with the type of lifter shown in the said application.

The improvement comprises an octagonal open frame 1, which is adapted to be arranged between the spaced longitudinal bars 2 of the supporting frame of the lifter shown in the above mentioned application, but forming no part of the present invention, and for that reason not further shown. The said frame is connected to the bars 2 by means of bolts 3, the said bolts being passed from within outward, and being engaged by nuts 4 outside the bars 2, and pivotally connecting the frame 1 with the bars 2. The frame 1 is arranged between the bars 2, as shown more particularly in Fig. 4, and the said frame has a rearwardly extending lug or arm 5 having an opening at its extremity for engagement by a loop 6 on a link 7, the said link extending to a point near the operator, and being arranged to permit the operator to swing the frame 1 into and out of operative position. The lug 5 extends from the uppermost member of the frame 1, and the said uppermost member and the lowermost member are provided with registering openings, for receiving the approximately T-shaped shank 8, which is provided at its upper end with spaced perforated ears 9, and at its lower end with the rearwardly extending angular arm 10, the said arm having a bearing 11 at its extremity, and having a series of longitudinally spaced openings 12.

The shank is mounted for vertical sliding movement in the frame 1, and a coil spring 13 acts normally to press the shank downward, the said spring 13 encircling a rod 14 having its lower end passed through one of the openings 12 of the arm 10, and having its upper end passed through an opening in the lug 5, the spring being arranged between the lug 5 and the arm 10. A nut 15 is threaded onto the rod 14 above the lug 5 to limit the downward movement of the rod.

A lever 16 is arranged between the lugs 9 of the shank, and is pivotally connected thereto by means of pin 17, and the rear end of the lever is rounded, as shown, and is curved downwardly and rearwardly, and is then passed through an opening 18 in the lug 5 before mentioned. A spacing block 19 is arranged below the arm 10, and the cutter 20 is arranged below the block, and the cutter and the block and the arm 10 are secured together by means of bolts and nuts 21, the said bolts being passed upwardly through the cutter, the block and the arm and engaged by the nuts above the arm.

The block is of approximately triangular form, as shown, and the blade 20 is of approximately crescent shape, the apex thereof being at the front of the block, and the sides diverge outwardly and rearwardly therefrom, as shown more clearly in Fig. 3. The block 19 is narrow, the base being rearward, and on each side is secured one of the arms 22 of a deflecting device, the apex and the body 23 of the said device being in front of the block, while the arms extend rearwardly and diverge outwardly. Each of the said arms 22 is cut away or recessed on its under side, as indicated at 24, in Figs. 1 and 2, the recess commencing near the rear edge of the cutting blade, and extending to the rear end of the said arm. The apex or body 23 of the deflecting device is beveled from above downward and rearwardly, in such manner that while the apex of the cutting blade is approximately flush with the front face of the shank 8, the peak or point of the deflecting device is some distance in advance of the said shank. The shank 8 moves in contact with rollers 24 and 25, the said rollers being arranged in front and in rear of the shank, and at the upper and lower portions of the frame 1. Each roller is provided with trunnions or journal pins 26 which are journaled in the frame 1. The body of the shank is T-shaped as before mentioned, and the roller 24 bears against the wide front face of the shank, while the roller 25 bears against the edge of the angular portion of the shank or the stem of the T.

A shoe 27 is arranged below the arm 10 of the shank, the said shoe having a wedge-shaped recess or slot 28 extending from its rear end toward the front, as shown in Fig. 6, and the said slot or recess receives the block 19. The rear end of the shoe is provided with bearings 29, which are adapted to register with the bearing 11 of the arm 10, and a journal pin or bolt 30 is passed through the registering bearings, for hinging the shoe to the arm 10 of the shank. It will be noticed from an inspection of Figs. 1 and 2, that the central portion of the shoe is curved downwardly, so that the arch or convexity of the curved portion engages the beet just before the cutting blades 20, and the said shoe determines the position of the cutting blade with respect to the beet, that is the said shoe determines how much of the crown of the beet will be removed by the cutting blade.

The shoe is provided with spaced bearing lugs 31 near the front end thereof, and the lower end of a link 32 is pivoted between the lugs, by means of a bolt or rivet 33. The upper end of the link 32 is provided with a longitudinal series of openings 34, and one end of the lever 16 is connected with one of the openings 34, by means of a pin 36. The said lever 16 is pivoted between the ears 9 of the shank, by means of the pin or rivet 17 before mentioned, and the rear end of the lever is rounded, and is curved or arched downwardly, as indicated at 38. The convexity of the curve of the portion 38 of the lever is directed toward the front, and the said lever portion passes through the opening 18 in the lug 5, the said opening 18 being between the rod 14 and the link 7.

The shape of the portion 38 of the lever 16 is such, that when the shank is lifted in a manner to be presently described, the lever portion 38 moves through the opening 18, and the lever is swung, to raise that end connected with the link 32, thus raising the shoe 27, as indicated in Fig. 2. When the shank is in its normally lowered position, as shown in Fig. 1, the downwardly curved portion of the shoe 27 is near the peak of the cutting blade 20, while when the shank is lifted, as shown in Fig. 2, the shoe is moved upward, by means of the lever 16, to increase the vertical distance between the arch of the shoe and the peak of the cutting blade.

In operation, the parts normally occupy the position shown in Fig. 1. The beets of a row are not of the same size, but vary very much in length and in height above the ground. Some of the beets are almost covered by the soil, as indicated in Fig. 1, while others have a considerable portion of their length above the surface of the ground, as indicated in Fig. 2. Were the shoe fixed with respect to the cutting blade, each beet would have a certain amount of its length cut away, regardless of size or of height above the ground. As a rule, beets of large size grow higher above the ground than beets of small size, and it is necessary to remove a greater portion of the beet of large size than of small size. When a beet of small size is engaged by the shoe, the entire device, that is the shank, shoe and cutting blade is lifted by the engagement of the arch of the shoe with the top of the beet. When the arched portion of the shoe engages the beet, the shoe rides upon the beet, and lifts the crowning device, thus determining the point at which the cutting blade will engage the beet. When a beet of larger size and extending higher above the ground is engaged by the shoe, the shoe is lifted higher than with the smaller beet, and the shank and the cutting blade are also lifted to a greater extent. The relative position of the curved portion of the lever and the lug 5 is thus changed, and the lever is swung to move the link 32 upward, to lift the shoe, to thus increase the vertical distance between the arch of the shoe and the cutting blade, so that the cutting blade engages the beet at a greater distance below its top, thus removing a greater portion of the crown of the beet. When the crown is removed, the deflecting device moves the crown and the top outwardly away from the row of beets, and when a row has been crowned, the tops are pushed to one side a sufficient distance to not interfere with the gathering of the beets. The shoe 27 is a guide for the cutting blade, and the said guide is so arranged that the relative position of the guide and the cutting blade is varied in accordance with the size of the beet.

I claim:—

1. A device of the character specified, comprising the combination with the beet lifter, of a supporting frame mounted to swing thereon on a transverse axis, a shank slidable vertically in the frame and provided at its lower end with a rearwardly extending arm, a cutting blade secured to the said arm in spaced relation, said blade being substantially triangular in form and arranged with its apex at the front and extending on both sides of the arm, a guide shoe hinged to the rear end of the arm and extending in front of the cutting blade above the same, said guide shoe being curved downwardly intermediate its ends to engage the top of a beet immediately before the blade strikes the side of the beet to determine the position of the blade with respect to the beet, a lever pivoted to the top of the shank intermediate its ends, a link connecting the front end of the lever to the guide shoe, said supporting frame having a rearwardly extending lug provided with an opening, said lever having a curved portion extending through the opening to cause the rear end of the lever to swing toward the shank when the shank is moved upward whereby to lift the front end of the shoe, and a spring normally pressing the shank downward.

2. A device of the character specified, comprising the combination with the beet lifter, of a supporting frame mounted to swing thereon on a transverse axis, a shank slidable vertically in the frame and provided at its lower end with a rearwardly extending arm, a cutting blade secured to the said arm in spaced relation, said blade being substantially triangular in form and arranged with its apex at the front and extending on both sides of the arm, a guide shoe hinged to the rear end of the arm and extending in front of the cutting blade above the same, said guide shoe being curved downwardly intermediate its ends to engage the top of a beet immediately before the blade strikes the side of the beet to determine the position of the blade with respect to the beet, a lever pivoted to the top of the shank intermediate its ends, said lever having its rear end curved, and the lug of the supporting frame having an opening through which the said curved end extends to cause the front end of the lever to be lifted relative to the shank when the shank moves upward, a connection between the front end of the lever and the shoe, and yielding means normally pressing the shank downward.

3. A device of the character specified, comprising the combination with the beet lifter, of a supporting frame mounted to swing thereon on a transverse axis, a shank slidable vertically in the frame and provided at its lower end with a rearwardly extending arm, a cutting blade secured to the said arm in spaced relation, said blade being substantially triangular in form and arranged with its apex at the front and extending on both sides of the arm, a guide shoe hinged to the rear end of the arm and extending in front of the cutting blade above the same, said guide shoe being curved downwardly intermediate its ends to engage the top of a beet immediately before the blade strikes the side of the beet to determine the position of the blade with respect to the beet, a lever pivoted to the top of the shank intermediate its ends, said lever having its rear end curved, and the lug of the supporting frame having an opening through which the said curved end extends to cause the front end of the lever to be lifted relative to the shank when the shank moves upward, and a connection between the front end of the lever and the shoe.

4. A device of the character specified, comprising the combination with the beet lifter, of a supporting frame mounted to swing thereon on a transverse axis, a shank slidable vertically in the frame and provided at its lower end with a rearwardly extending arm, a cutting blade secured to the said arm in spaced relation, said blade being substantially triangular in form and arranged with its apex at the front and extending on both sides of the arm, yielding means normally pressing the shank downward, a guide shoe hinged to the rear end of the arm and extending in front of the cutting blade above the same for engaging the top of the beet prior to the engagement of the blade therewith to determine the point of engagement of the blade with the beet, a lever pivoted to the shank and connected to the shoe, and means in connection with the lever and the supporting frame for constraining the shoe to move upward when the shank moves upward at a greater speed than the speed of movement of the shank.

5. A device of the character specified, comprising a supporting frame adapted to be connected with a beet lifter, a shank mounted for vertical sliding movement in the frame, a cutting blade supported by the shank below the same, a guide shoe hinged to the shank above the cutting blade and extending in front thereof for engaging the beets prior to the engagement of the blade therewith to determine the point of said engagement, a lever pivoted intermediate its ends to the shank, a connection between one end of the lever and the shoe, the supporting frame having an opening through which the other end of the lever extends, said lever end being curved to constrain the said end to move downwardly when the shank moves upward whereby to lift the shoe with respect to the shank, and yielding means for normally pressing the shank downward.

6. A device of the character specified, comprising a supporting frame adapted to be connected with a beet lifter, a shank mounted for vertical sliding movement in the frame, a cutting blade supported by the shank below the same, a guide shoe hinged to the shank above the cutting blade and extending in front thereof for engaging the beets prior to the engagement of the blade therewith to determine the point of said engagement, a lever pivoted intermediate its ends to the shank, a connection between one end of the lever and the shoe, the supporting frame having an opening through which the other end of the lever extends, said lever end being curved to constrain the said end to move downwardly when the shank moves upward, whereby to lift the shoe with respect to the shank.

7. A device of the character specified, comprising a supporting frame adapted to be connected with a beet lifter, a shank mounted for vertical sliding movement in the frame, a cutting blade supported by the shank below the same, a guide shoe hinged to the shank above the cutting blade and extending in front thereof for engaging the beets prior to the engagement of the blade therewith to determine the point of said engagement, a lever pivoted to the shank, a connection between one end of the lever and the shoe, and means in connection with the lever and the supporting frame for constraining the shoe to move upwardly at a higher speed than the movement of the shank when the said shank is moved upward.

8. A device of the character specified, comprising a supporting frame adapted to be connected with a beet lifter, a shank mounted for vertical sliding movement in the frame, a cutting blade supported by the shank below the same, a guide shoe hinged to the shank above the cutting blade and extending in front thereof for engaging the beets prior to the engagement of the blade therewith to determine the point of said engagement, and means for constraining the shoe to move upward at a greater rate of speed than the movement of the shank when the shank is moved upward.

9. A device of the character specified, comprising a supporting frame, a crowning blade mounted for vertical sliding movement on the frame, a guide shoe above and in front of the crowning blade for engaging the beets prior to the engagement of the blade therewith to determine the point of the said engagement, and means operated by the upward movement of the blade for moving the shoe upward at a higher rate of speed than the speed of movement of the blade.

10. A device of the character specified, comprising a supporting frame, a crowning blade mounted for vertical sliding movement on the frame, a guide shoe above and in front of the crowning blade for engaging the beets prior to the engagement of the blade therewith to determine the point of the said engagement, and means operated by the upward movement of the blade for moving the shoe upward at a higher rate of speed than the speed of movement of the blade.

11. A device of the character specified, comprising a supporting frame, a crowning blade mounted for vertical sliding movement on the frame, a guide shoe above and in front of the crowning blade for engaging the beets prior to the engagement of the blade therewith to determine the point of the said engagement, means operated by the upward movement of the blade for moving the shoe upward at a higher rate of speed than the speed of movement of the blade, and means in connection with the blade for moving the crowns away from the beets.

JAMES B. DAWSON.

Witnesses:
A. C. SMITH,
W. C. HARRIS.